July 8, 1952

W. R. BATTLES 2,602,486

VEHICLE SEAT CONVERTIBLE TO BED

Filed Feb. 3, 1947

INVENTOR.
WILLIS R. BATTLES
BY
Christie & Angus
ATTORNEYS

July 8, 1952  W. R. BATTLES  2,602,486
VEHICLE SEAT CONVERTIBLE TO BED
Filed Feb. 3, 1947  5 Sheets-Sheet 2

INVENTOR.
WILLIS R. BATTLES
BY
*Christie & Angus*
ATTORNEYS

July 8, 1952              W. R. BATTLES            2,602,486
VEHICLE SEAT CONVERTIBLE TO BED Filed Feb. 3, 1947                              5 Sheets-Sheet 4

INVENTOR.
WILLIS R. BATTLES
BY
*Christie & Angus*
ATTORNEYS

July 8, 1952  W. R. BATTLES  2,602,486
VEHICLE SEAT CONVERTIBLE TO BED
Filed Feb. 3, 1947  5 Sheets-Sheet 5

INVENTOR.
WILLIS R. BATTLES
BY
Christie & Anger
ATTORNEYS

Patented July 8, 1952

2,602,486

UNITED STATES PATENT OFFICE 2,602,486

VEHICLE SEAT CONVERTIBLE TO BED

Willis R. Battles, Redondo Beach, Calif.

Application February 3, 1947, Serial No. 726,073

2 Claims. (Cl. 155—7)

This invention relates to a convertible vehicle seat particularly adapted to use in automobiles. More particularly, the invention relates to an automobile seat which may be immediately and quickly converted to form a bed within the automobile.

Flexibility in automobile design sufficient to permit use thereof for comfortable travel and also for comfortable sleeping accommodations is becoming more and more desirable and will become increasingly so as leisure time is more plentiful. There have been in the past, many ideas advanced for the design of automobile interiors which have contemplated the utilization of either the back or the front seat or both to form a bed within the automobile. In general, these ideas have been limited in their utility by the complexity thereof or due to the fact that they are suitable only if they are incorporated in an automobile at the time of manufacture, or only if employed in a particular make of automobile.

It is, therefore, an object of the present invention to provide a new and improved type of seat construction which will be adaptable to the great majority of automobile makes and models and which may be simply and quickly converted to form a bed in the seating compartment of the automobile.

Additional objects and advantages of the invention will become apparent upon the consideration of the following description and the accompanying drawings.

The great majority of automobiles at the present time, are fitted with front seats that are adapted to swift and simple removal, and this characteristic is taken advantage of by my invention in the provision of an alternative convertible seat framework which may be readily substituted in the space of as little as five or ten minutes, for the existing front seat.

Briefly the invention comprises the structural elements necessary to furnish support for the horizontal and normally upright cushioned members of the front seat of an automobile, together with means for connecting the horizontal and upright members in such a manner that the latter may be pivoted to a horizontal position disposed between the horizontal members of the front seat and the back seat. In this manner a substantially flat surface is formed by the three seat members on which surface a bed may be readily prepared.

The supporting framework for the horizontal member of the front seat comprises in its simplest elements an adjustable framework which is adjustable both in the direction of the transverse axis and the longitudinal axis of the automobile body. The adjustable framework is provided with suitable means whereby it may be fastened directly to the support member for the presently existing front seat. Additional means are provided for the adjustment of the seat framework as a whole with respect to the longitudinal axis of the car which means permits the framework to be slidably mounted to the aforementioned support member whereby its longitudinal placement may be simply and efficiently controlled.

Further, means in the form of one or more specially designed hinges are provided whereby the horizontal and the normally upright seat members may be connected to each other in adjustable relationship. This last named means permits the pivoting of the normal upright member of the seat through an angular displacement of from about 45° to about 180° with the horizontal seat member.

The invention may be more clearly understood and additional features thereof will be apparent from the following detailed description taken in relation to the accompanying drawing in which.

Figure 1:
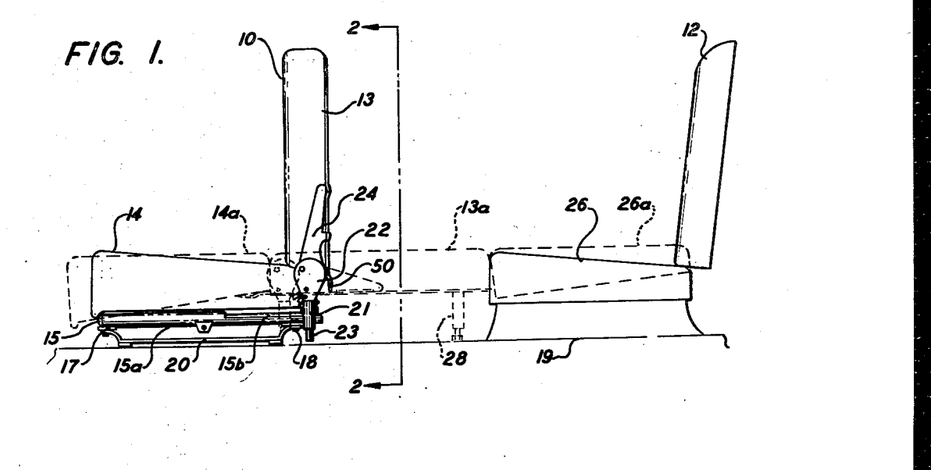
Fig. 1 is a side elevation of the front and back seats of an automobile showing the cushions and the structural elements of the front seat of the invention.

The normal automobile interior and particularly the interior of a sedan is comprised of a front seat 10 and a rear seat 12 as shown in Fig. 1. In addition the front seat 10 normally consists of the upright member 13 and the horizontal member 14. Affixed to the floor 19 of the automobile is the supporting structure 20. The supporting structure 20 may conveniently be the support for the existing front seat or may be specially constructed for the seat of the invention. Fastened to the support or base 20 by means hereinafter described is the framework 15 which consists of the two members 15a and 15b. The member 15a is rigidly affixed to the base 20 and forms a housing within which the member 15b is mounted in such a fashion as to be slidable in the direction of the longitudinal axis of the automobile. The horizontal cushioned member 14 rests on the member 15a of the framework 15 but is fastened to the member 15b and is thus responsive to the longitudinal placement thereof.

Figure 11:
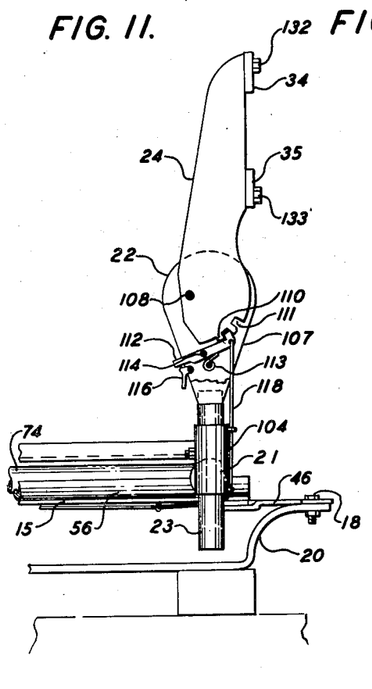
Fig. 11 is a side elevation of the hinge member which permits the rotation of the normally upright member of the seat structure.
Figure 12:
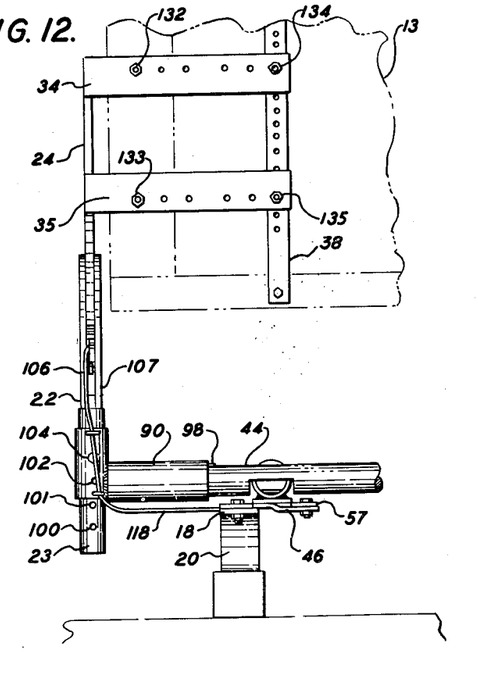
Fig. 12 is a rear elevation of the hinge member of Fig. 11, showing the means of affixing the normally upright cushion member to the hinge member.

Forming a part of the framework 15b is the cylindrical collar 21 adapted to hold the hinge member 22 and to permit its vertical adjustment by being keyed to receive the post 23 of the hinge 22 in different vertical positions. Forming a part of the hinge 22, which is more clearly described with reference to Figs. 11 and 12, is the leaf member 24 to which the normally upright cushioned member 13 is affixed. It is to be understood that in the preferred embodiment of the invention hereinafter described, a pair of hinge members 22 is employed, one at either end of the seat framework 15. Alternatively, additional hinge members may be employed, but it is preferable to employ at least 2 to provide the desired structural strength to the upright member 13.

Figure 17:
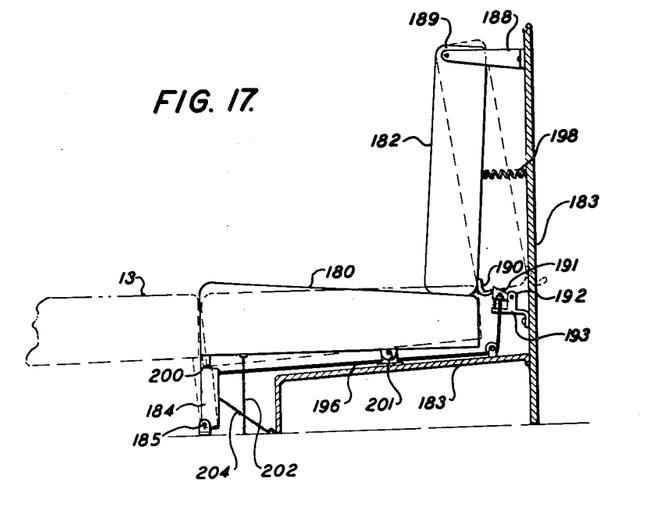
Fig. 17 is a sectional elevation of a rear seat structure which may be conveniently employed in conjunction with the front seat structure shown in Figs. 1 to 16.

As shown in Fig. 1, the upright member 13 may be pivoted to the horizontal position as shown by dotted lines at 13a in which position the normally horizontal member 14 is adjusted as shown at 14a by means hereinafter described to form a substantially level surface with the upper face of the upright member as shown in the horizontal position of 13a. In addition the normally horizontal member 26 of the rear seat may be adjusted as shown in Fig. 17 to the position shown by the dotted lines and indicated as 26a in Fig. 1. However, such is not a necessary feature of the invention as a satisfactory bed may be obtained by simply providing for the adjustability of the members 13 and 14, to form a horizontal surface in conjunction with the normal positioning of the horizontal member 26 of the rear seat 12.

One or more leg members 28 may be affixed to the normally upright member 13 so as to support the rear portion thereof when the same is rotated to the horizontal position as shown by the dotted lines. The leg member or members 28 are more clearly illustrated in Figs. 14, 15 and 16 and will be more particularly described hereinafter.

Figure 2:
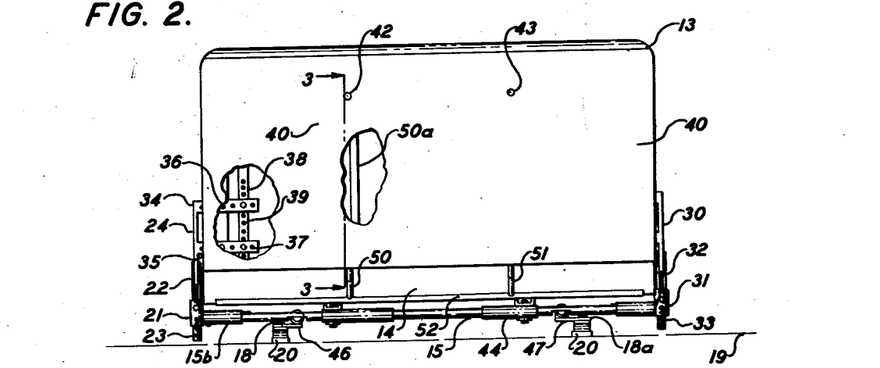
Fig. 2 is a rear elevation of the adjustable front seat framework of the invention.

In Fig. 2, which is a rear elevation on the line 2—2 of Fig. 1, there is shown the means whereby the normally upright member 13 is mounted to the leaf member 24 of the hinge 22 and the corresponding leaf member 30 of the hinge 32. The leaf member 24 is provided with the projecting tabs 34 and 35, each of which are provided with a plurality of holes 36, 37, etc., any one of which may be superimposed over similar holes, 39, in a vertical support member 38 of the normally upright member 13. Thus, by provision of a plurality of holes in the vertical support 38, the member 13 may be adjusted to the proper vertical position and by the provision of the plurality of holes in the leaf tabs 34 and 35, upright members of varying widths may be adapted to the seat structure. Disposed over the entire back of the upright member 13 is the cover 40 which is partially cut away in Fig. 2 to show the means of affixing the seat member to the leaves 24 and 30 of the hinges 22 and 32 as above described. The sockets 42 and 43, socket 42 being shown in detail in Fig. 3, may be provided through the cover member 40 and in the framework of the normally upright member 13 in which legs, as hereinafter described, may be inserted when the normally upright member 13 is pivoted to the horizontal position.

Also shown in Fig. 2, is the transverse member 44 of the member 15b of the framework 15. Means are provided in the form of straps 46 and 47 whereby the member 15a of the framework 15 may be adapted to be affixed by means of the bolts 18 and 18a to various sized bases such as base 20 in different models of cars. These means are more clearly seen with reference to Fig. 4.

In making up a bed by rotating the normally upright member 13 to the horizontal position 13a as shown in Fig. 1, it is highly desirable that the normally horizontal member 14 of the front seat be automatically leveled so as to form a smooth surface with the upper face of the back member. This may be accomplished in one embodiment of the invention by providing the back member with a pair of leveling prongs 50 and 51 which engage the underenath surface of the horizontal cushion member when the back member 13 is pivoted to the horizontal position and lift the same as shown at 14a in Fig. 1, so that the upper surfaces of the two cushions form a substantially horizontal and smooth surface. The prongs 50 and 51 are so placed that upon pivoting the back member 13 the tips of the prongs are inserted between the transverse member 44 of the seat framework 15 and the lower rib 52 of the horizontal cushion member and thereby effect the leveling of the cushion without interfering with the framework 15. The leveling prongs 50 and 51 may be mounted to the upright member 13 in any desired manner. They are shown in Fig. 2 affixed to a holder 50a and a corresponding holder (not shown) respectively, which are mounted transversely on the member 13.

Figure 4:
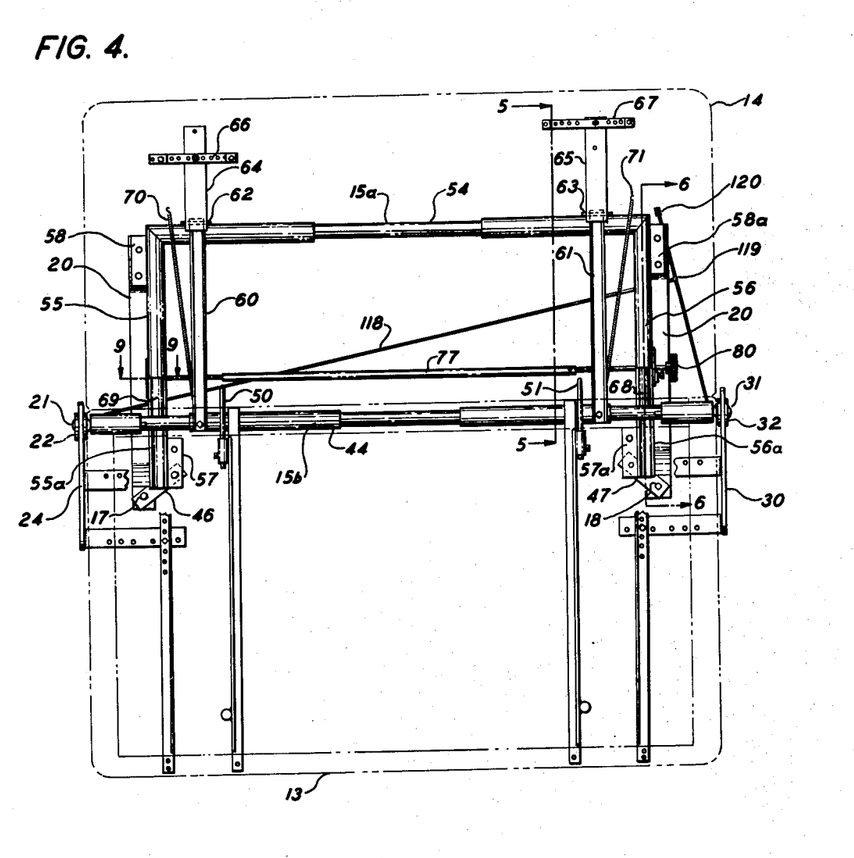
Fig. 4 is a plan view of the front seat with the normally upright member in the horizontal position and with the cushions of the seat removed.

The structure of the framework 15 together with the means for mounting the horizontal cushion member thereon and its relationship to the hinges and the normally upright member are shown in plan view in Fig. 4 as it would look with the back member 13 in a horizontal position, and with the seat cushions removed.

As above described, the framework 15 which is mounted to the base 20 consists of the two members 15a and 15b. The member 15a consists of the transverse rod 54 joining the two parallel longitudinal tubes 55 and 56. The longitudinal tubes 55 and 56 are provided with the cleats 57 and 58, and 57a and 58a, respectively. The forward cleats 58 and 58a are affixed directly to the framework 20 and the rear cleats 57 and 57a are affixed to the framework 20 by means of the pivotally mounted straps 46 and 47 and the bolts 17 and 18. The straps 46 and 47 may be provided with a plurality of perforations, or with longitudinal grooves so as to permit the member 15a to be mounted to various size bases.

The member 15b is formed by the transverse element 44 and the longitudinal rack bars 68 and 69 projecting forwardly therefrom and spaced so as to lie within the tubular members 55 and 56 of the member 15a as hereinafter described. To permit transverse adjustment of the framework 15 the transverse members 44 of the member 15b and 54 of the member 15a are comprised of telescoping bars and tubes which permit the positioning of the longitudinal tubes 55 and 56 in the correct place to be engageable with the base member 20 and of the rack bars 68 and 69 within the tubes 55 and 56 respectively. This transverse adjustability of the framework 15 may be accomplished in many ways and the telescoping transverse members here shown only serve to show one means of accomplishment thereof. The transverse adjustability may be obtained by constructing the members 44 and 54 of overlapping plates, angles, channels or other adjustable devices.

Figure 5:
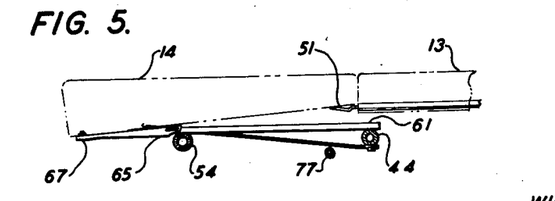
Fig. 5 is a partial sectional elevation of the means of mounting the seat cushion of the normally horizontal member on the framework of Fig. 4.

To permit the normally horizontal cushion member 14 to be adjusted by means of the prongs 50 and 51 in the manner heretofore described and at the same time to respond to the adjustment of the member 15b along the longitudinal axis of the automobile, the cushion member 14 is pivotally affixed to the framework 15b. Two longitudinal support members 60 and 61 are affixed to the transverse member 44 and are pivotally joined at their forward ends by means of the pins 62 and 63 to the flaps 64 and 65 respectively, affixed to the underside of the seat framework of the seat member 14 by means of the cleats 66 and 67. As shown in Fig. 5, which is a sectional elevation on the line 5—5 of Fig. 4, the longitudinal member 61, affixed to the rear transverse member 44 passes over the forward transverse member 54 of the member 15a and is joined in proximity to the transverse member 54 to the flap 65 by means of the pin 63 (shown in Fig. 4.) The flap is affixed to the seat member 14 by the cleat 67. When the prong 51 and the corresponding prong 50 are inserted under the rear edge of the seat member 14, which insertion takes place upon pivoting the back member 13 to the horizontal position as shown in Fig. 5, the seat member 14 pivots about the forward transverse member 54 of the framework 15 at the point of joinder of the arm 61 and the flap 65. Pivotal mounting of the horizontal seat member 14 is desirable so as to permit the forward and rearward edges of the seat 14 to adjust themselves rather than to accomplish entire adjustment by the lifting of the rear edge of the seat member. Thus, by permitting the front edge of the member to drop a small distance, the rear edge need not be elevated to such an extent in order to get the upper surface of the cushion 14 in a horizontal position. Alternatively the cushion may be mounted in the conventional manner in which case it will be leveled by pivoting about the front edge. The coil springs 70 and 71 are affixed to the forward portion of the under surface of the horizontal member 14 and to the under part of the transverse member 44 so as to hold the seat snugly against the longitudinal supports 60 and 61 when the seat member is not engaged by the leveling prongs 50 and 51.

Returning to Fig. 4, the longitudinal members 55 and 56 of the supporting framework 15 are tubular in nature and are cut away in their rearward portion as shown at 55a to be semicircular in shape. These tubular longitudinal members 55 and 56 permit the longitudinal adjustment of the seat 10 as hereinafter more fully described.

Figure 6:
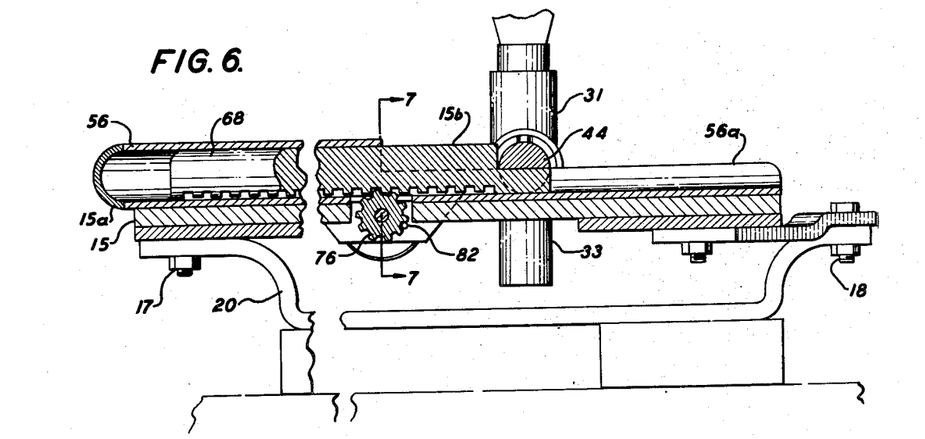
Fig. 6 is a side sectional elevation of the means of mounting the seat framework on the support members affixed to the vehicle floor.

In Fig. 6, the structure of the longitudinal member 56 is shown in sectional elevation taken on the line 6—6 of Fig. 4. In Fig. 6 there is shown one side of the base member 20 to which the framework 15 is affixed by means of the bolts 17 and 18 in the manner shown and described with relation to Fig. 4. The member 15a comprises the longitudinal member 56 which is tubular throughout the forward portion of its length and which is cut away at the line 7—7 of Fig. 6 so as to be semicircular in nature. Riding in the tubular member 56 is the rack 68 to which the transverse member 44 is affixed. The transverse member 44 likewise affixed to a corresponding rack 69 riding in the longitudinal member 55 (Fig. 4), supports the collar 31 and the corresponding collar 21 shown in Figs. 1, 2 and 4, which collars provide the receptacles for the hinge posts 23 and 33, respectively.

Disposed in a housing beneath the member 56 and operable through an opening in the lower portion thereof is the pinion gear 76 which is connected by the tie rod 77 (shown in Fig. 4) to a corresponding pinion gear 79 located in association with the longitudinal member 55. The gears 76 and 79 (shown in Fig. 9) are operable by the knob 80 which when turned causes the racks 68 and 69 to travel within the tubes 55 and 56 which causes the longitudinal displacement of the transverse member 44 and thus of the hinges 22 and 32. In this simple fashion both the horizontal and upright members of the front seat may be adjusted with respect to the longitudinal axis of the automobile a distance limited only by the length of the cut away portion 55a and 55b of the longitudinal members 55 and 56.

Figure 7:
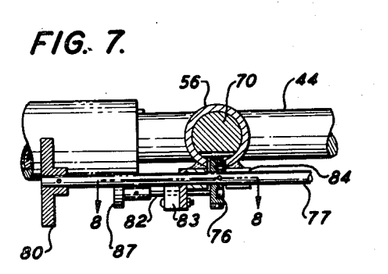
Fig. 7 is a section on the line 7—7 of Fig. 6.

The means of adjustment described with relation to Fig. 6 is shown in Fig. 7, which is a sectional elevation taken on the line 7—7 of Fig. 6. As shown in Fig. 7, the transverse member 44 affixed to the rack 68 may be adjusted with respect to the longitudinal axis of the automobile by causing the rack 68 and the corresponding rack 69 to travel within the respective tubular members 56 and 57 by means of rotation of the gears 76 and 79 by the rotation of the knob 80 which is joined to the gear 76 and to its companion gear 79 by means of the tie rod 77.

Figure 8:
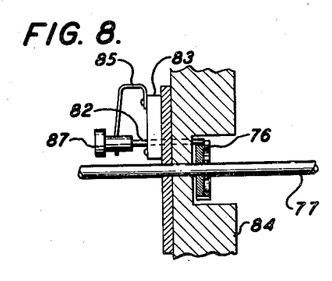
Fig. 8 is a plan view on the line 8—8 of Fig. 7.

To lock the seat structure in the position desired, means are provided for preventing the rotation of the gears 76 and 79. These means comprise the spring loaded pin 82 shown in Figs. 7 and 8 (Fig. 8 being an elevational view on the line 8—8 of Fig. 7) as projecting through a flange 83 on the rear of the housing 84 and engaging the teeth of the gear 76. The pin 82 is normally maintained in engagement with the teeth of the gear 76 by the leaf spring 85 which exerts an inward thrust on the pin 82. When it is desired to alter the longitudinal placement of the seat member the pin 82 is withdrawn from engagement with the teeth of the gear 76 by pulling the knob 81 so as to withdraw the pin 82 and at the same time turning the knob 80 so as to accomplish the change in longitudinal adjustment as hereinbefore set forth.

Figure 9:
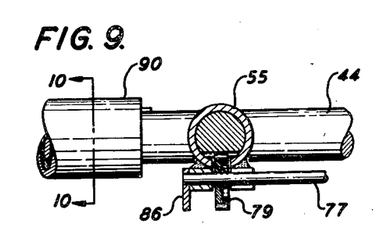
Fig. 9 is a section on the line 9—9 of Fig. 4.

The tie rod 77, as hereinbefore described, extends from the pinion gear 76, located in a housing 84 of the longitudinal member 56 to the pinion gear 79 located in the housing 86 in the corresponding longitudinal member 55 as shown in Fig. 9, which is a sectional elevation taken on the line 9—9 of Fig. 4. Fig. 9 differs from Fig. 7 only in the absence of the extension of the tie rod 77 upon which is affixed the knob 80 and in the absence of the locking pin 82 which by locking the pinion gear 76 effectively locks the gear 79.

As an alternative embodiment of the means permitting longitudinal adjustment of the seat member, the two gears mounted in the housings 84 and 86, forming a part of the longitudinal members 55 and 56 may be sprocket gears adapted to engage holes punched in the longitudinal members 68 and 69 forming a part of the framework 15b. In such case the members 68 and 69 are rods provided with a plurality of downwardly opening holes in which the teeth of the sprocket gear may be inserted.

Figure 10:
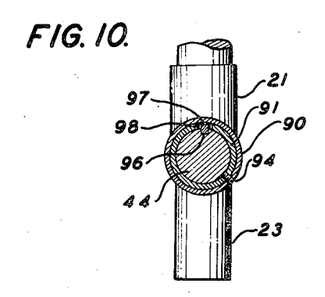
Fig. 10 is a sectional elevation on the line 10—10 of Fig. 9.

As shown in Fig. 4, the hinges 22 and 32 are affixed to the transverse member 44. The means whereby the hinge is so affixed to the transverse member 44 is shown in the elevation view of Fig. 10 taken on the line 10—10 of Fig. 9. As hereinbefore described the hinge post, as for example, hinge post 23 of the hinge 22, is mounted within the vertically disposed collar 21. Projecting at right angles from the collar 21 is the collar 90 in which is disposed a concentric tubular member 91. The tubular member 91 is held within the tubular member 90 by means of the set screw 94. The transverse member 44 is inserted within this tubular member 91. To prevent the hinge and thus the upright seat member from rotating by means other than the rotation of the leaf members 24 and 30, the transverse member 44 is provided with a key 96 fitted into a slot 97a provided therefor on the outer periphery parallel to the longitudinal axis of the member 44. This key 96 is adapted to fit snugly into a corresponding groove 97 provided in the inner tubular member 91. The permanent tilt of the back member 13 may be adjusted by means of a plurality of shims 98 whereby the positioning of the key 96 with respect to the member 44 may be adjusted. Thus, as shown in Fig. 10, the key 96 is spaced within the slot 97a by two shims on either side thereof. It may be readily appreciated that by spacing the key 96 with three shims on one side and only one on the other or with four on one side and none on the other the normal angular displacement from the vertical of the back member 13 may be easily altered.

The construction of the hinges employed in the present invention is illustrated in Fig. 11, which is a side elevation of the hinge member and in Fig. 12, which is an end elevation of the hinge member. The hinge comprises the post 23 which is mounted in the sleeve 21 which is affixed to the transverse member 44 of the seat framework as hereinbefore described. As shown in Fig. 12, the post 23 is provided with a plurality of transversely drilled holes 100, 101, 102, etc., through which the bolt 104 passing through the sleeve 21 may be inserted to hold the post 23 in the desired vertical relationship to the transverse member 44.

Affixed to the post 23 are the two parallel plates 106 and 107 which form a yoke in which the leaf member 24 is pivoted. In the cut away elevation view of Fig. 11, the plate 106 is eliminated so as to more clearly show the means whereby the supporting leaf member 24 is pivoted therein. As shown in Fig. 11 the leaf member 24 is affixed to the plate 107 and likewise to the plate 106 by the pin 108 about which the leaf member and consequently the upright seat member 13 pivots.

The leaf member 24 terminates at its lower end in the shape of a cam which is provided with the notches 110 and 111 which are engaged by the pawl 112. The pawl 112 is spring mounted by the spring 113 between the plates 106 and 107 and pivots about the point 114 so as to normally engage one of said notches 110 and 111 unless withdrawn therefrom. By pivoting the pawl 112 about the point 114 it may be withdrawn from either of the notches 110 or 111 so as to permit the leaf member 24 and the back of the seat 13 to rotate to the horizontal position.

By engaging the pawl 112 with the notch 111, the seat member 13 may be rotated through a corresponding angular displacement to place it in a reclining rather than a horizontal position. In a similar fashion, a plurality of additional notches may be provided in the cam shaped end of the leaf member whereby the seat member 13 may be pivoted to substantially any position between the horizontal and the vertical. It will be seen that the notch 110 is extended from the point of abutment to the front face of the cammed portion of the leaf 24 which provision is made to permit the forward tilting of the seat if such be desired as is the case in convertible coupes or the like. This is not a necessary feature of the invention for other types of cars and the notch 110 may be defined in the same manner as the notch 111.

In the majority of such convertible seats, a pair of hinge members such as hinges 22 and 32 will be employed in which case, in order to permit the pivoting of the back rest member 13 it will be necessary to disengage the pawl 112 and a similar pawl in the second hinge member at the same time in order to permit the displacement of the back member. Various means may be employed in order to facilitate the accomplishment of this disengagement of the two pawls, two of which means are shown in Figs. 11 and 12. One means of maintaining the pawl 112 in the disengaged position comprises the eccentric latch lift 116 which it pivotally mounted to the hinge members 106 and 107 in such a fashion that when used to pry the pawl 112 from the notch 110 or the notch 111, the force of the spring 113 exerting a downward force on the upper part of the latch lift 116 causes the same to remain in engagement with the pawl 112 until released by hand. A means of accomplishing the simultaneous disengagement of the pawl 112 and the corresponding pawl of a second hinge member is shown in Figs. 4 and 12 and comprises a cable 118 affixed to the pawl 112 and extended beneath the framework 15 to join a second cable from the second hinge at a point 119 as shown in Fig. 4. Thus, both cables may be pulled by means of the common pull handle 120 and both pawls may be released at the same time to permit the pivoting of the back member 13 to the horizontal position.

The means whereby the leaf members 24 and similarly the corresponding leaf member of a second hinge may be affixed to the back rest member 13 is clearly shown in Fig. 12. The leaf member 24 is provided with the two straps 34 and 35 projecting from the leaf member 24 to the back rest member 13, as hereinbefore described with relation to Fig. 2. By the provision of a plurality of holes on the longitudinal axis of the straps 34 and 35 and by the provision of a plurality of holes in the vertical support member 38, the leaf member 24 may be affixed to substantially any conventional back rest member by virtue of the wide variation in the longitudinal and vertical joining made possible by the plurality of holes. Thus, in Fig. 12 the straps 34 and 35 are affixed to the back rest member 13 by the bolts 132 and 133 and by the bolts 134 and 135, respectively.

Figure 13:
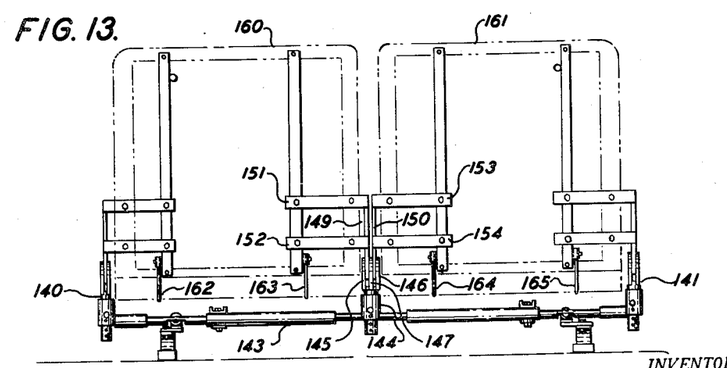
Fig. 13 is a modification of the apparatus particularly adapted to use in convertible coupes in which the upright portion of the front seat is normally divided.

In Fig. 13 there is shown a modification of the apparatus hereinbefore described particularly adapted to use in convertible coupes or two-door sedans wherein it is desirable to provide a divided back cushion in order to permit the tilting forward of one or the other of such cushions for access to the back seat. In the embodiment shown in the rear elevation of Fig. 13, the hinges 140 and 141 at the extremity of the transverse supporting member 143 are the same or similar to the hinge 22 hereinbefore described. A third hinge 144 is mounted at the center of the transverse member 143 and differs from the hinges 140 and 141 in being provided with three parallel plates 145, 146 and 147, rather than the two parallel plates as described with relation to hinge 22. The three parallel plates 145, 146 and 147 permit the pivoting of two leaf members 149 and 150 which are provided with straps 151, 152 and 153 and 154 respectively, which project in opposite directions from the leaf members 149 and 150 so as to form support members for the two back elements 160 and 161 forming the back cushioning of the divided seat member. In this embodiment of the invention, each of the back members 160 and 161 is provided with a pair of seat lift bars 162 and 163, and 164 and 165 respectively, for engaging the under surface of the horizontal seat member when the back members 160 and 161 are pivoted to the horizontal position.

Figure 3:
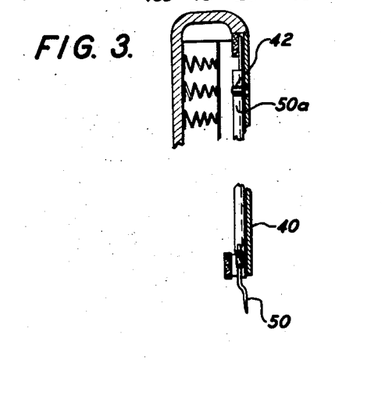
Fig. 3 is a side sectional elevation on the line 3—3 of Fig. 2, of the normally upright member of the front seat.
Figure 14:
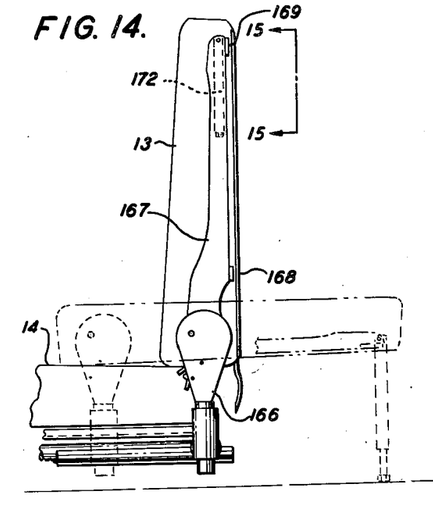
Fig. 14 is a partial phantom view of the seat assembly showing the operation of the leg member and its relationship to the normally upright member.
Figure 15:
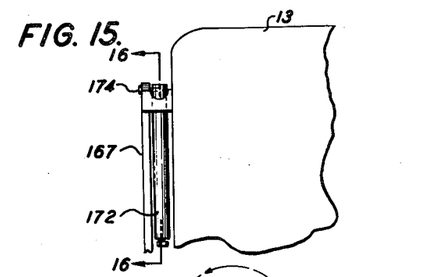
Fig. 15 is a partial rear elevation taken on the line 15—15 of Fig. 14.
Figure 16:
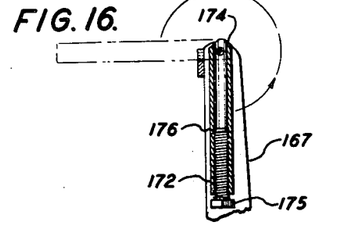
Fig. 16 is a sectional elevation taken on the line 16—16 of Fig. 15.

The back rest member 13 of the convertible seat when in the horizontal position requires support to maintain that portion of the member remote from the hinge off of the floor of the automobile. As illustrated in Figs. 2 and 3 and described in relation thereto, one means of providing such support is by the provision of two or more leg members which are adapted to fit into the sockets 42 and 43 of the back member. An alternative means of accomplishing this support is illustrated in Figs. 14, 15 and 16, wherein the back member 13 is shown affixed to the horizontal member 14 by means of the conventional hinge 166 provided with the leaf member 167. The leaf member 167 is similar to the leaf member 24 of hinge 22, differing therefrom only in the height to which it projects. As shown in Fig. 14, the leaf member 167 projects from the hinge plate 166 substantially the full height of the back rest member 13 and is provided with the straps 168 and 169 similar to the straps 34 and 35 as shown in Figs. 11 and 12 but being spaced from each other a greater distance than the straps 34 and 35.

Pivotally mounted to the inner surface of the leaf member 167 is the leg member 172. The means of mounting the leg 172 is more clearly seen in Fig. 15 which is a partial elevation view taken on the line 15—15 of Fig. 14. The leaf member 167 is spaced from the back rest member 13 a distance sufficient to permit the placement of the leg member 172 therebetween. The leg member 172 is pivotally mounted to the leaf member 167 by means of the pin 174 in such a fashion that when the back rest member 13 is disposed in the horizontal position the leg member 172 will rotate about the pin 174 so as to remain in the vertical position to support the back rest member 13 from the floor of the vehicle.

Fig. 16, which is a sectional elevation on the line 16—16 of Fig. 15, shows the leg member 172 to be tubular in structure. As shown in Fig. 16 and, as described above, the leg member 172 remains in the vertical position when the seat member 13 is pivoted to the horizontal position and furnishes the support necessary between the floor of the vehicle and the under surface of the back rest 13 when the latter is in a horizontal position.

In the preferred form of the invention, the leg member is so constructed that its length is adjustable so that the back rest member 13 may be spaced from the floor at the proper level. This adjustability may be accomplished by constructing the supporting legs as shown in Figs. 14, 15 and 16 with a foot member 175 internally threaded into the tubular member 176. The length of the leg is thus dependent upon the proportionate insertion of the foot 175 into the tubular member. Other means of adjustability, of course, may be employed to accomplish this purpose and the embodiment here described is merely illustrative of one type of adjustable leg.

An additional embodiment of the present invention, is the provision of a back seat which is particularly adapted to co-operate with the convertible seat member above described so as to form a bed. Such a back seat member is shown in sectional elevation in Fig. 17 and comprises the horizontal cushion 180 and the upright cushion 182 supported by the framework 183. The front portion of the horizontal cushion member 180 is supported by the pivotal bracket 184 which is pivotally mounted to the floor of the vehicle by the clamp 185 and by a second such bracket on the opposite end of the cushion member 180.

The normally upright member 182 is pivotally mounted to the bracket 188 at the point 189 and is maintained in its normal position, as indicated by the solid lines, by the cleat 190 which forms a part of the cushioned member 182 and which abuts against the stop 191, pivotally mounted at the point 192 to the supporting arm 193 affixed to the framework 183. The stop 191 is adapted to operate cooperatively with the bracket 184 so that when the latter is pivoted out to the position indicated by the dotted line the cable 196 retracts the stop 191 from the position shown so that the upright member 182 may be pushed to the position indicated by the dotted line against the compresesion of spring 198. At the same time the normally horizontal member 180 will drop into the recessed step 200 of the support member 184 and in so doing will pivot about the point 201 so that the front portion of the seat will be pulled down by the spring 202 a distance equivalent to the offset 200 and the rear portion of the seat 180 will be raised a proportionate amount as indicated by the dotted line.

When the support member 184 is withdrawn from the normal position as shown by the dotted line it serves as a support for the rear edge of the front of the back rest member 13 of the front seat 12. The spring 204 is provided whereby support 184 is returned to its normal position by lifting the front edge of the horizontal cushion 180. When the support 184 returns to its normal position the upright member 182 is likewise returned to its normal position and the cleat 190 again engages the front edge of the stop 191.

Having described the seat structure of the invention its operation is readily understood. To install the seats in a conventional automobile, the existing front seat of the automobile is removed leaving the supporting structure 29 within the automobile. The convertible seat of the invention is inserted and mounted to the support structure as hereinbefore described. Alternatively, the entire existing seat assembly may be removed and a base member inserted to which the convertible seat of the invention may be affixed.

When it is desired to form a bed within the car the pawls which hold the hinge leaves in the substantially vertical position are removed from the notches of the hinge member permitting the back rest of the convertible seat to fall to the horizontal position. In order that the back rest member 13 will be disposed between the front edge of the back seat 12 and the rear edge of the horizontal member 14 of the front seat 10, the knob 80 is turned after releasing lock member 82 so as to move the seat forward in the manner as described so as to permit the back rest member 13 to fall into the horizontal position as shown by the dotted line 13a of Fig. 1.

As the back rest member 13 rotates to the horizontal position it automatically elevates the rear edge of the normally horizontal member 14 of the front seat by means of the lift bars affixed to the lower edge of the back rest member.

When it is desired to convert the bed back into a seat member, the back rest member 13 is merely swung from the horizontal to the substantially upright position shown by the solid lines in Fig. 1, and the pawl of the hinge is again engaged with the notches of the supporting leaf members so as to retain the back rest member in the vertical position. The seat may then be adjusted with respect to its longitudinal placement in the automobile by means of the knob 80 as hereinbefore described so as to be positioned in the desired spot to permit convenient driving.

An additional feature of the invention permits the back rest member 13 of the seat to be tilted backward to substantially any point between the vertical and the horizontal so as to form merely a reclining seat rather than a bed. This is accomplished by merely releasing the pawl of the hinge or hinges from the notch corresponding to the normally upright position of the back rest member 13 and reinserting the pawl in any one of the plurality of possible notches so as to retain the back rest member 13 at any position between the horizontal and the vertical. Such an application may be conveniently used when driving to permit a passenger to ride in a semi-reclining position by providing a triangular shaped cushion or back rest between the sloping cushion of the seat and the driver. In such fashion the driver may sit in the normal upright position while the passenger reclines. Alternatively, by employing the divided seat back as shown in Fig. 13, the member 161, for example, may be tilted to a reclining position while the member 160 is left in the normally upright position for the driver.

Having described and illustrated my invention it is apparent that many mechanical variations therein will occur from the foregoing description and the following claims without departing from the scope of the invention.

I claim:

1. In a vehicle seat comprising a horizontal cushion member and two upright cushion members forming together a single vehicle seat, means for attaching the two upright cushion members to the horizontal cushion member in independent pivotal relationship comprising first and second tubular sockets mounted at opposite ends of the horizontal cushion member adjacent the rear edge thereof and a third tubular socket mounted to the rear edge of the horizontal cushion member intermediate the opposite ends thereof, a separate hinge member mounted in each socket, the hinge members in the first and second sockets comprising a post extending upwardly from the socket, a pair of parallel plates affixed at the upper end of the post and extending upwardly therefrom, and a third plate pivotally mounted between the parallel plates and extending upwardly therefrom, and means for affixing the third plate to separate one of the upright cushion members, a hinge in the intermediate socket comprising a post extending upwardly therefrom, three parallel plates affixed at the upper end of the post extending upwardly therefrom, two plates interleaved between the parallel plates and pivotally mounted therein, and means affixing one of said two plates to one of said upright cushion members and means affixing the other of said two plates to the other of said upright cushion members.

2. In a vehicle seat comprising upright and horizontal cushion members, means for attaching the upright and horizontal members in pivotal relationship comprising a separate tubular socket mounted at opposite ends of the horizontal cushion member adjacent the rear edge thereof and opening upwardly, a separate hinge member mounted in each socket, each hinge comprising a post extending into a socket and upwardly therefrom, a pair of parallel plates affixed at the upper end of the post and projecting upwardly therefrom, a third plate pivotally mounted to and between the parallel plates and forming a cammed lower edge, a plurality of notches in said lower edge of the third plate, a spring loaded pawl pivotally mounted between the parallel plates and adapted to engage in the notches in the cammed lower edge of the third plate, an eccentric latch lift pivotally mounted to the inner face of one of the plates adjacent the under edge of the extending arm of the pawl whereby rotation of the latch lift exerts a releasing force on the pawl, and means for affixing the third plate to the upright cushion member.

WILLIS R. BATTLES.

REFERENCES CITED

The following references are of record in the file of this patent:

UNITED STATES PATENTS

| Number | Name | Date |
|---|---|---|
| 624,008 | Genge | May 2, 1899 |
| 931,857 | Fromhart | Aug. 24, 1900 |
| 1,294,301 | Norton | Feb. 11, 1919 |
| 1,304,454 | Carlisle | May 20, 1919 |
| 1,315,031 | Munro | Sept. 2, 1919 |
| 1,640,984 | De Petris | Aug. 30, 1927 |
| 1,811,917 | Cota | June 30, 1931 |
| 1,836,321 | Graham | Dec. 15, 1931 |
| 1,981,212 | Zeller | Nov. 20, 1934 |
| 2,275,656 | Saunders | Mar. 10, 1942 |
| 2,286,784 | Benzick et al. | June 16, 1942 |
| 2,297,176 | Thompson | Sept. 29, 1942 |